(12) United States Patent
Patterson (10) Patent No.: US 6,659,267 B2
(45) Date of Patent: Dec. 9, 2003

(54) TWO-MASS, BASE-EXCITED CONVEYOR

(75) Inventor: Harold E. Patterson, Indiana, PA (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 10/007,843

(22) Filed: Nov. 5, 2001

(65) Prior Publication Data

US 2002/0139642 A1 Oct. 3, 2002

Related U.S. Application Data

(60) Provisional application No. 60/245,874, filed on Nov. 4, 2000.

(51) Int. Cl.$^7$ .............................................. B65G 27/00
(52) U.S. Cl. ..................... 198/771; 198/760; 198/766; 198/770
(58) Field of Search ................................. 198/771, 759, 198/760, 763, 766, 770

(56) References Cited

U.S. PATENT DOCUMENTS

| | | | |
|---|---|---|---|
| 4,274,953 A | * 6/1981 | Jackson | 209/326 |
| 4,313,535 A |   2/1982 | Carmichael | |
| 4,771,894 A | * 9/1988 | Lapp | 209/632 |
| 5,178,259 A | * 1/1993 | Musschoot | 198/753 |
| 5,265,730 A | * 11/1993 | Norris et al. | 209/326 |
| 6,041,915 A | * 3/2000 | Fishman et al. | 198/766 |
| 6,047,811 A | * 4/2000 | Zittel et al. | 198/763 |
| 6,415,913 B2 | * 7/2002 | Sleppy et al. | 198/766 |

* cited by examiner

*Primary Examiner*—Douglas Hess
(74) *Attorney, Agent, or Firm*—Wood, Phillips, Katz, Clark & Mortimer (57) ABSTRACT

A vibratory conveying device comprise an elongated trough for transporting materials, and a base underlying the trough. A plurality of elongated leaf springs support the trough on the base, with a vibratory drive system operatively connected to the base for effecting vibratory movement of the trough. Economical manufacture and efficient maintenance are facilitated by configuring the base so that it comprises a pair of sheet-like base side members, with a laterally extending drive support member extending therebetween. In the preferred form, the drive support member is detachably connected to the base side members with suitable mechanical fasteners. In turn, a pair of rotary vibratory drives of the drive system are removably mounted on respective opposite sides of the drive support member by a plurality of threaded mechanical fasteners.

12 Claims, 12 Drawing Sheets

TWO-MASS, BASE-EXCITED CONVEYOR

FIELD OF THE INVENTION

The present invention relates to vibratory conveyors, and particularly to base-excited vibratory conveyors which include a trough that is spring mounted to a base wherein the base is excited by a vibration driver, and the trough is vibrated through the spring mounting.

BACKGROUND OF THE INVENTION

Vibratory conveyor devices are in widespread use in view of their versatile material-handling capabilities. Such devices typically include a generally elongated trough or bed that is vibrated by an associated drive system so that material is conveyed along the length of the trough.

A typical two-mass, vibratory conveyor of the base-excited conveyor design includes a trough structure supported on elongate springs extending from a base support structure that is vibrated by an eccentric rotating mass. The vibration is transmitted to the trough through the springs. In typical constructions of two-mass vibratory conveyors, the base support structure of the conveyor includes a pair of longitudinal base members typically constructed from heavy walled tubing or solid plate steel to obtain the desired structural characteristics, and in part to obtain the specific desired weight relationship between the trough and the support structure.

Generally, in operation, the total stroke of the vibrating conveyor is divided between the trough and the base support structure, including the base members, in inverse proportion to their mass ratio. Since it is desirable to minimize the vibratory motion of the support structure to thereby facilitate isolation of the conveyor-transmitted vibration to surrounding structures, the support structure, including the base members, is typically more than twice the weight of the trough structure.

Certain prior art two-mass conveyor designs are configured such that the directed force exciting the conveyor falls on a line aligning the centers of gravity of both the trough and base members of the conveyor, and perpendicular to a face of the drive springs. This design is disclosed in U.S. Pat. No. 4,313,535, for example. This patent discloses a base-excited conveyor having a linear forcing function drive means which generates a force drive line that is co-linear with a line passing substantially through the centers of gravity of the trough mass, conveyor system mass, and the base mass.

As a result of this design approach, it is often necessary, particularly with short conveyors, to add large amounts of weight to the base member such that the plural centers of gravity may be brought into alignment.

In base-excited conveyors, the stroke on the base is dependent on the tuning of the conveyor, and the relationship of the natural frequency of the mass/spring system to the operating frequency of the conveyor. The resultant base weight to trough weight ratio can be in a range of 1.5:1 to 3:1 or more depending on the available force, and how close to resonance it is necessary to tune the conveyor to get the desired trough stroke.

Prior base or support member designs use heavy base beam construction, at considerable cost and weight. Some prior designs not only employ the heavy base design but also uses a separate motor driven dual shaft exciter that is comprised of many components and is costly to produce in limited quantity. In some of the prior art designs that use the dual rotary vibrators, if one of the vibrators should fail, the resulting unbalance could cause structural failure of the conveyor.

In some prior art designs the rotary vibrators are mounted externally on the conveyor base members, on opposite sides of the base and with the eccentrics rotating about parallel, tilted vertical axes. In these conveyors, the entire structure must be stiff enough (four times the operating speed) to have the vibrators synchronize at operating speed. This leads to large costly structures particularly since weight lowers the natural bending frequencies, so stiffness has to be achieved from the member geometry, resulting in the use of large deep members. If the members are not sufficiently stiff, the vibrators tend to lock onto the bending mode frequency so not only will the conveyor not operate properly, but also structural damage could occur as the bending mode is excited.

The present inventor has recognized that it would be advantageous to provide a conveyor design that comprises a minimum of parts. The present inventor has recognized that it would be advantageous to provide a conveyor design whereby the overall weight of the conveyor, and particularly the weight of the base, is minimized. The present inventor has recognized that it would be advantageous to provide a conveyor design that utilizes a compact and economical vibratory exciter and provides an overall economically manufactured design.

SUMMARY OF THE INVENTION

The vibratory conveying device embodying the present invention includes a trough for transporting materials and a base underlying the trough. The trough is supported from the base by a plurality of elongated leaf springs. A vibratory exciter or vibratory drive is connected to the base. The base comprises two sheet metal plates or "wing plates" arranged in parallel along opposite sides of the conveyor.

According to the invention, the vibratory drive, in the form of dual rotary vibrators, is mounted on a stiff lateral or transverse beam that spans between, and is connected to, the wing plates, such that any natural bending frequency of the stiff lateral beam is at least four times higher than the operating speed of the conveyor. This allows the eccentric weights of the separate vibrators to synchronize, as they operate close to the tuned natural frequency of the conveyor mass spring system, such that the unbalanced forces produced by the rotating eccentric weights of each vibrator add to each other only along the drive line axis and cancel each other out in all other directions.

The use of the stiff mounting beam allows the use of lighter sheet metal construction for the balance of the base members since the wing plates are sufficiently stiff in the direction of the drive line axis, and there are no unbalanced forces produced to excite any bending natural frequencies of the other base members.

The use of the sheet metal construction and the simple construction and assembly of the vibratory exciter using commercially available rotary vibrators, for example using part number C6028 16 vibrators available from Martin Engineering of Neponset, Ill., greatly reduce cost to manufacture the vibratory conveyor. Additionally, in the event that one vibrator should fail in this design, the conveyor would only bounce up and down and feed improperly, since there would be no unbalanced forces effecting bending of the base structural members. Also, the entire exciter package can be dismounted from the conveyor for replacement or repair in one piece, for easy maintenance.

Other features and advantages of the present invention will become readily apparent from the following detailed description and the accompanying drawings.

DETAILED DESCRIPTION OF THE PREFERRED EMBODIMENTS

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to the specific embodiment illustrated.

Figure 1:
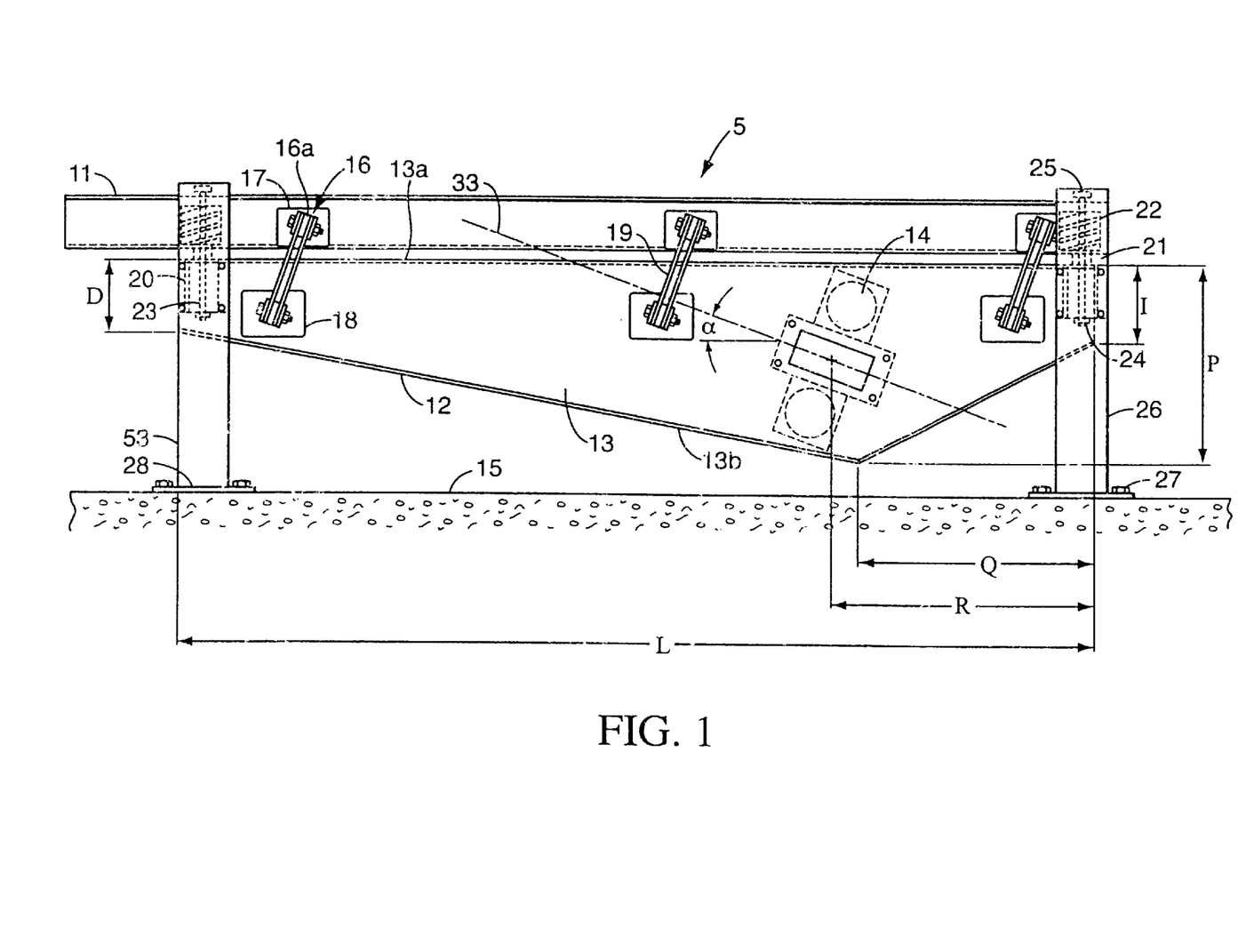
FIG. 1 is an elevational view of a conveying apparatus of the present invention.
Figure 8:
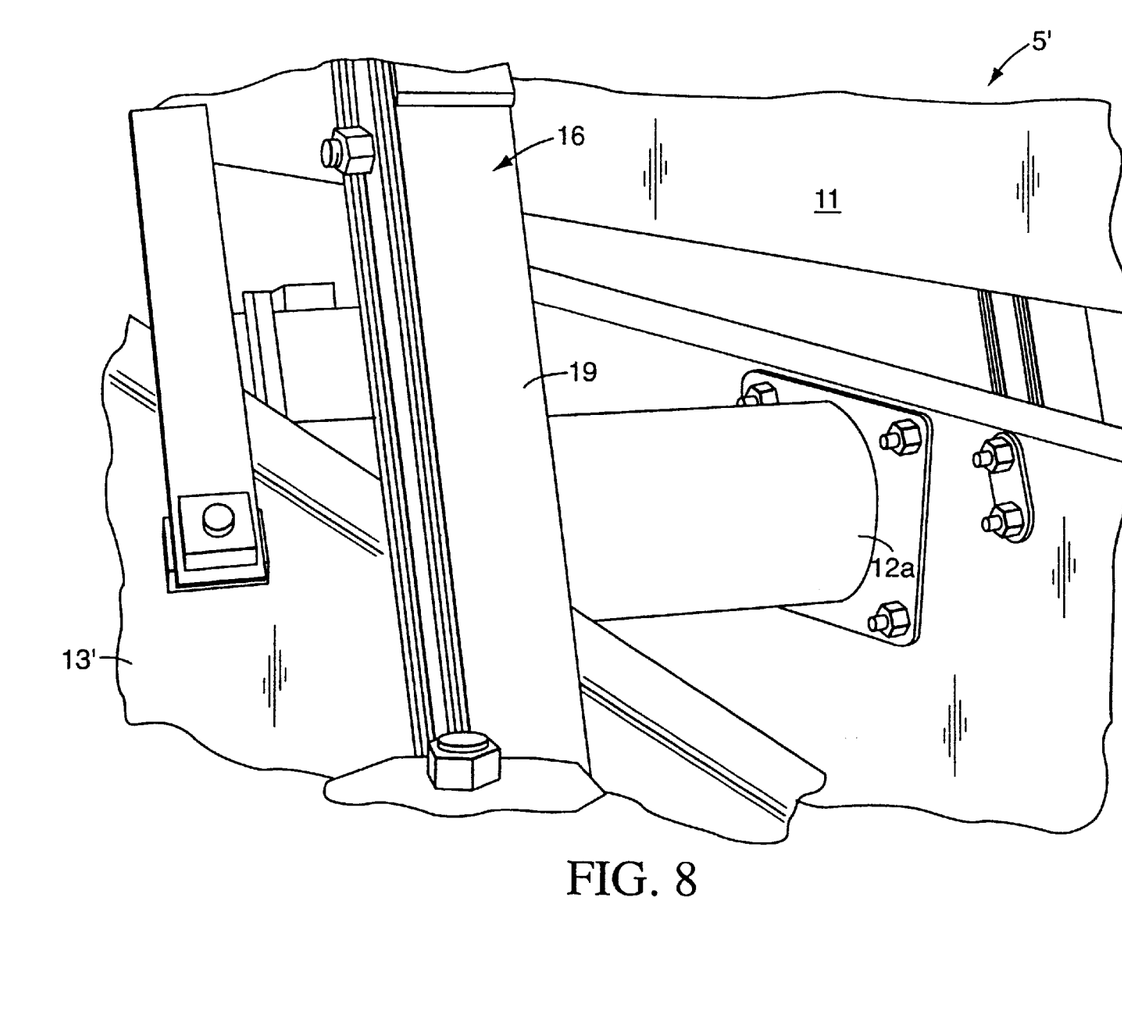
FIG. 8 is an enlarged, fragmentary perspective view of the apparatus of FIG. 7.
Figure 9:
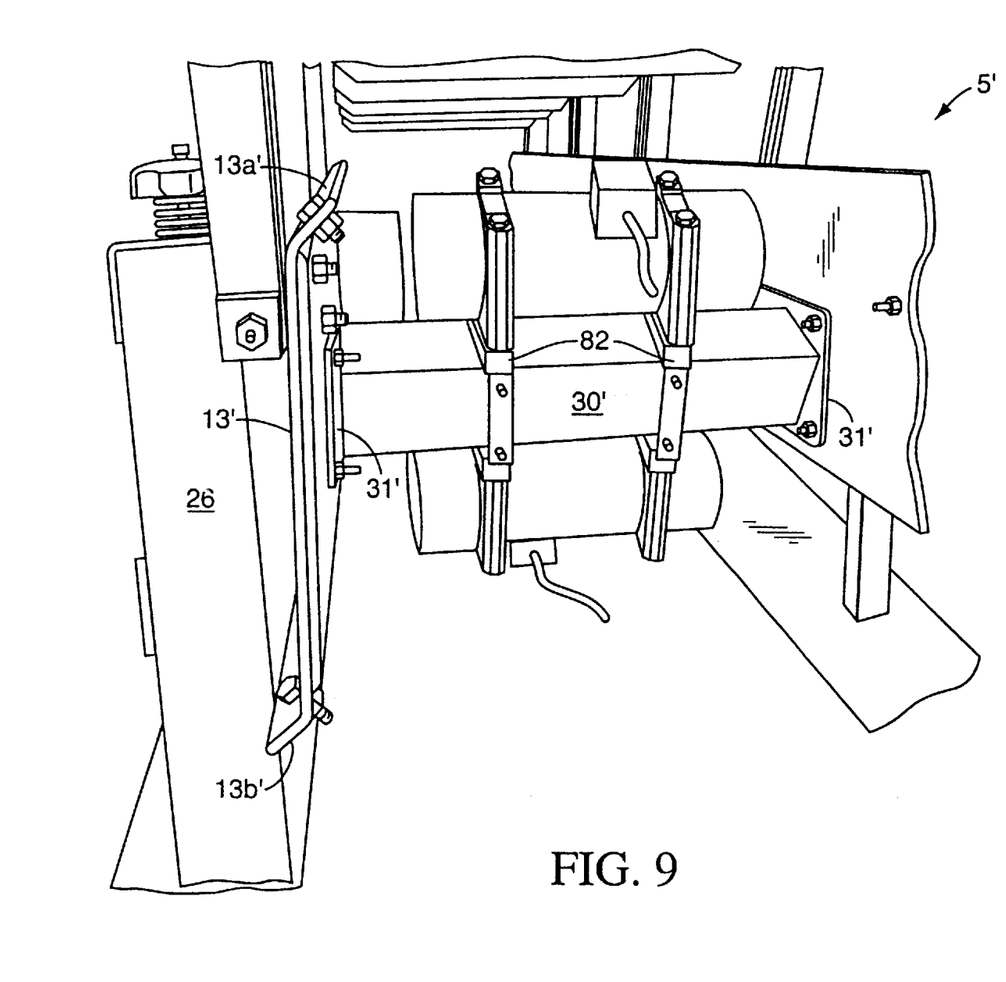
FIG. 9 is a fragmentary, side perspective view of the apparatus of FIG. 6.
Figure 10:
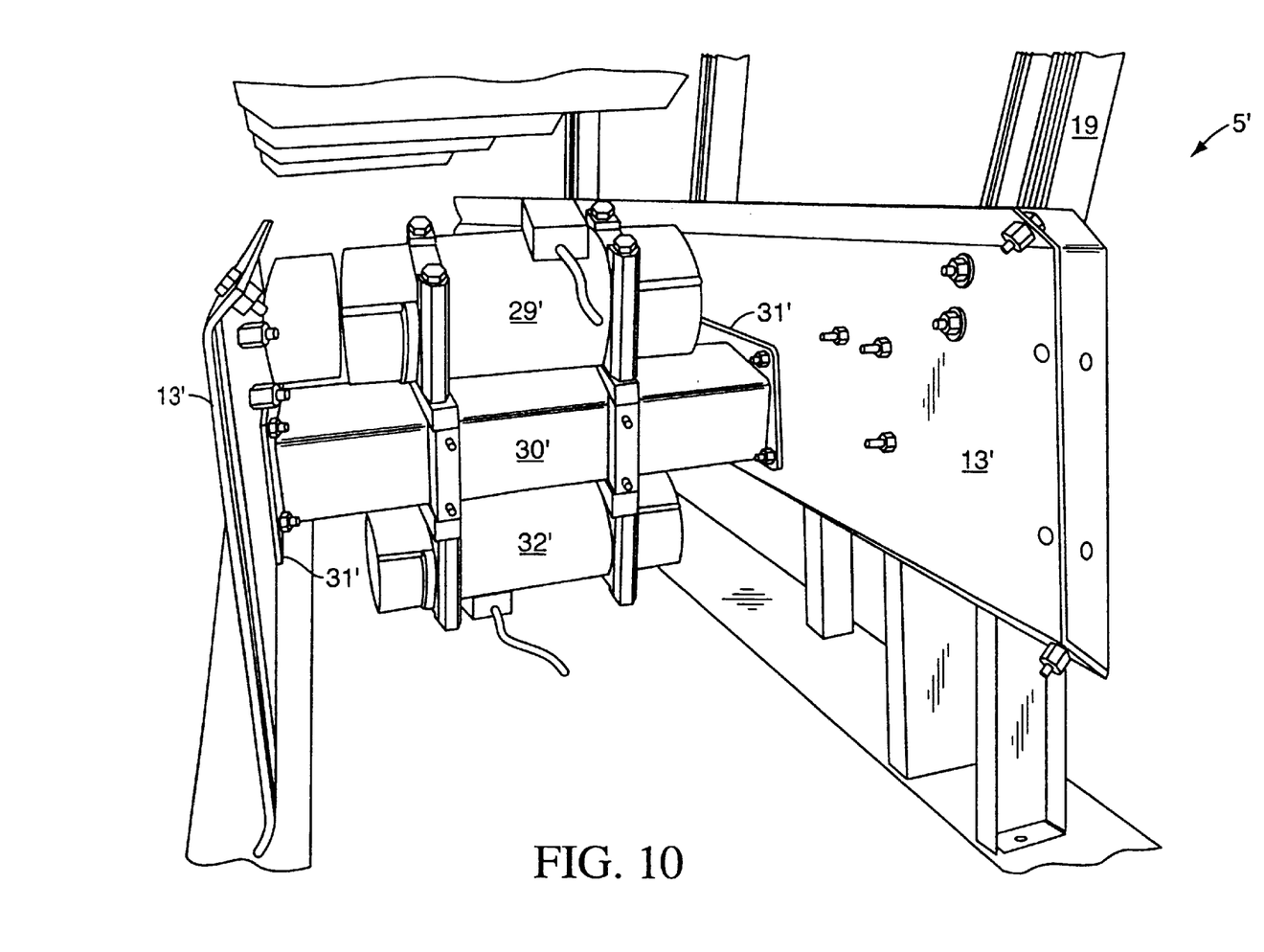
FIG. 10 is a further fragmentary, side perspective view of the apparatus of FIG. 6.

FIG. 1 illustrates an exemplary embodiment base-excited conveyor 5. A trough member 11 is connected to base side members 12 by means of leaf spring assemblies 16. The base side members 12 comprise two sheet metal wing plates 13. A vibratory exciter assembly 14 extends laterally from one wing plate 13 to the other. One or more cross rib members or beams 12a (shown for example in FIG. 8), also extend laterally from one wing plate 13 to the other, as may be required for structural integrity. The exciter assembly 14 is mounted at a suitable drive angle a from the horizontal, such that a drive line 33 is formed that passes through a vertical center 35 (FIG. 2) of the exciter assembly 14 and the combined center of gravity of the trough and base members. Alternately, in a preferred embodiment, the drive line 33 only passes through the center of gravity of the trough member or within a tolerance distance of the center of gravity of the trough member. The relationship between the center of gravity of the trough and the base, the drive line, and the tuning of the spring system and drive system are more fully explained in U.S. Ser. No. 08/819,234 filed Mar. 17, 1997 and herein incorporated by reference.

Figure 12:
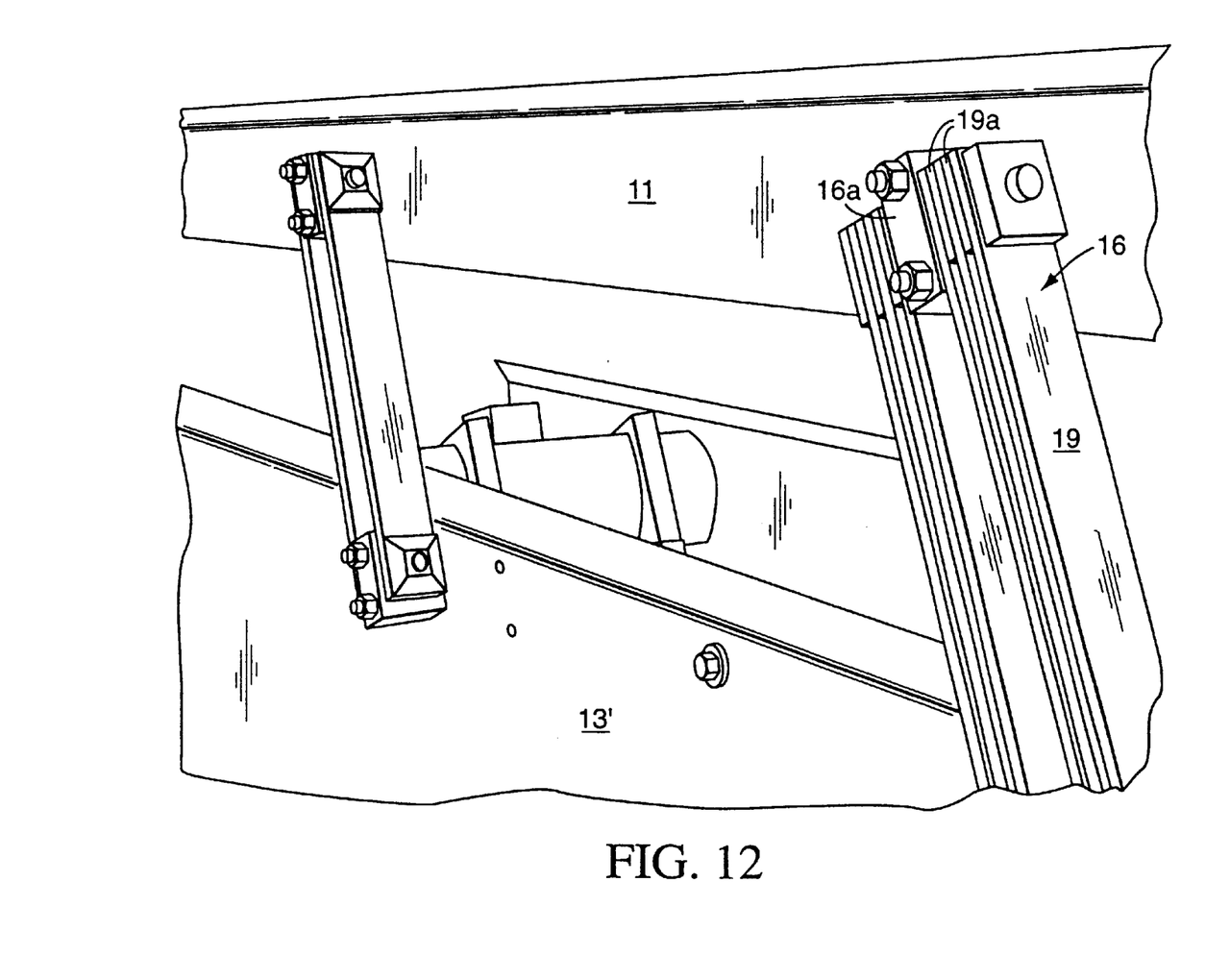
FIG. 12 is an enlarged fragmentary, perspective view of the apparatus of FIG. 6.
Figure 13:
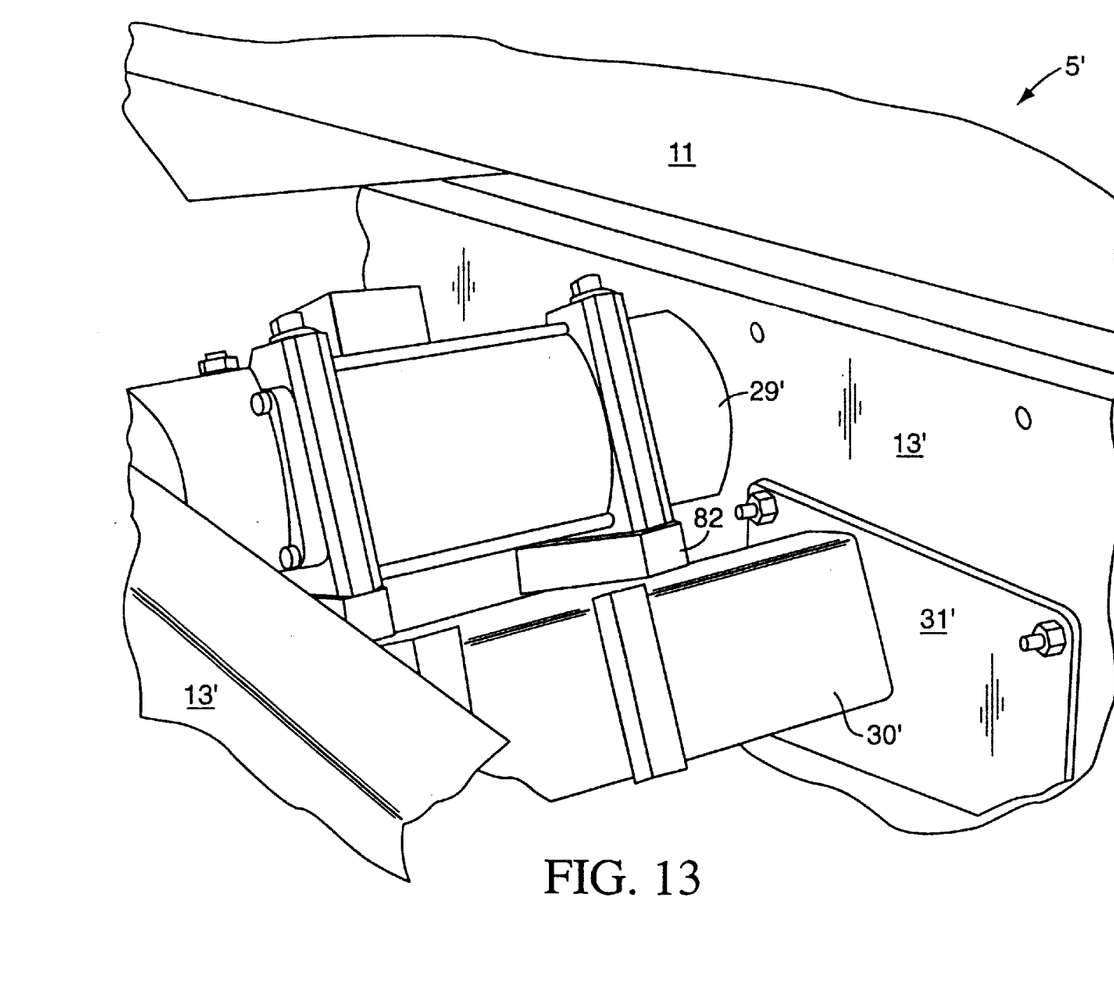
FIG. 13 is an enlarged, fragmentary perspective view of the apparatus of FIG. 6.

The leaf spring assemblies 16, are connected between trough-mounting brackets 17, and wing plate mounting brackets 18, that are welded or bolted to the trough member 11, and the wing plates 13, respectively. Each spring assembly consists of one or more leaf springs 19 bolted at each end to a protruding stub 16a on the trough mounting brackets 17, and the wing plate mounting brackets 18. If multiple leaf springs 19 are required, they are distributed evenly on each side of the protruding stub 16a of the spring mounting brackets 17 and 18, for example, two springs are shown in FIG. 1, one on each side of the protruding stub. Metal spacers 19a (shown for example in FIG. 12) can be used on each side of the leaf spring members 19, to protect the surface of the springs, to properly space the springs, and to evenly distribute the clamping forces across the leaf springs.

The conveyor is isolated from a mounting surface 15 by suitable isolation means, for example, by two front isolator pedestal assemblies 53, and two rear isolator pedestal assemblies 26, as shown in FIG. 1. Each pedestal consists of a U-shaped vertical column formed from sheet metal, enclosed at the top with a sheet metal plate, and at the bottom by a mounting plate 28. The pedestals are fastened to the mounting surface 15 by means of suitable bolts or lag screw hardware 27. An isolation spring mounting plate 21, having a large hole in its center, is welded into the upper portion of the pedestal columns 53 & 26. An isolation spring 22 is placed on the top of the mounting plate 21. A suspension cable 23, having threaded ferrules on each of its ends, is bolted to a weighted isolation spring plate 25, and hung down through the isolation spring 22, and the mounting plate 21. The remaining end of the suspension cable 23, is passed through the bottom hole of the isolation wing plate mounting bracket 20 and is fastened using suitable washer, lock washer and nut hardware.

Figure 2:
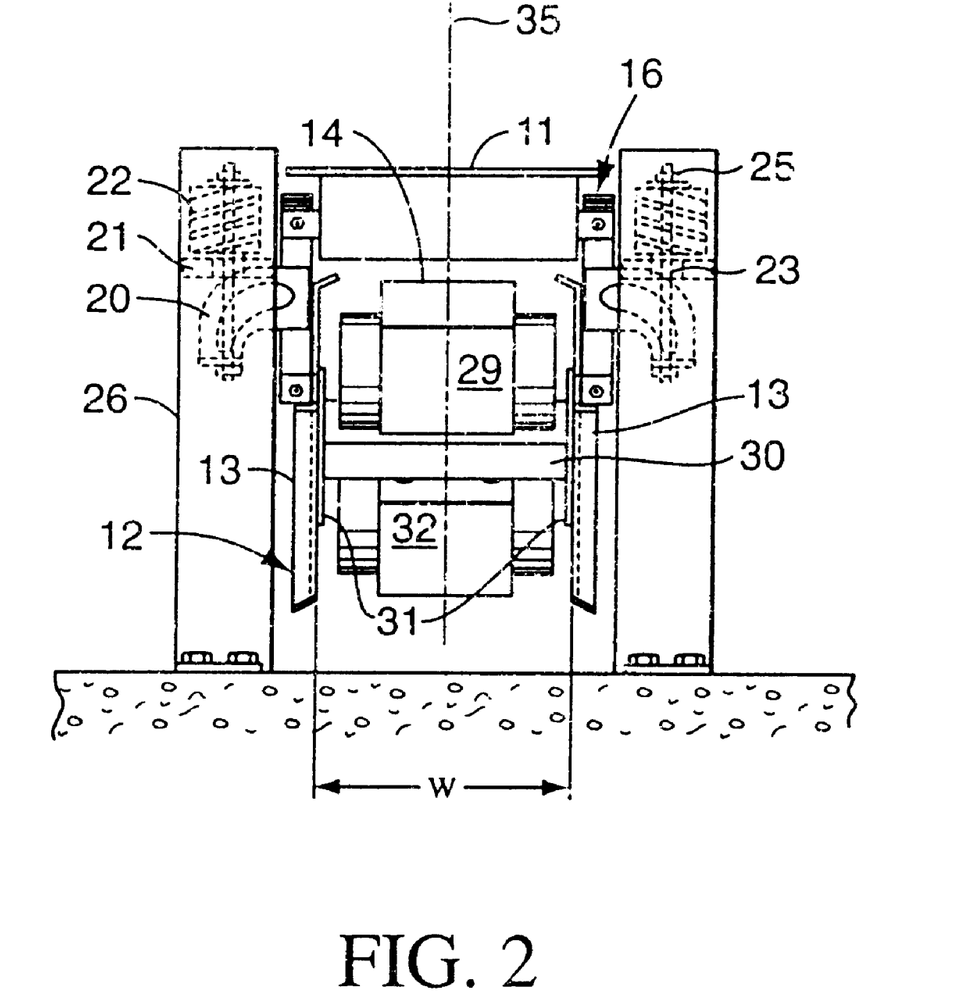
FIG. 2 is a right side end view of the conveying apparatus of FIG. 1.

FIG. 2 is an end view of the conveyor assembly showing all of the components described above and provides clarifying detail of the individual members. The exciter assembly 14, is comprised of commercially available rotary vibrators 29 and 32, mounted on a substantial transverse beam 30, to which two end mounting plates or brackets 31 have been welded. The mounting plates 31 are bolted to the inside surfaces of the wing plates 13, by means of suitable fastener hardware. The rotary vibrators 29, 32 each include an eccentric weight (not shown) that rotates about a horizontal transverse axis. The eccentric weights of the two vibrators are rotated in opposite directions such that a vibratory force is created along the drive line 33, and unbalanced forces are effectively cancelled out in all other directions.

One advantage of the configuration of the exciter assembly 14 is that the two rotary vibrators can be easily removed together for maintenance or repair by removing the beam 30 from the wing plates 13.

Referring back to FIG. 1, the wing plates 13 have an overall length L, an inlet height I, and a discharge height D. The plates 13 have a peak height P located at a distance Q from the right end of the wing plate 13. A center of the vibratory exciter assembly 14 is located at approximately a distance R from the right end of the wing plate. The beam 30 and brackets 31 have a width W (FIG. 2). The wing plates have a lip or flange 13a on a top side bent inwardly and a lip or flange 13b on a bottom side bent outwardly. The flanges have a width of approximately 2 inches and are bent at about 30 degrees from the wing plates. The flanges 13a, 13b provide additional lateral stiffness to the wing plates 13.

The approximate dimensions and specifications of an exemplary embodiment of the invention are as follows:

L=104", D=10", 1=11",
P=19",
Q=24",
R=27", and
W=18"

The wing plates preferably are composed of stainless steel and have a wall thickness of about 7 gauge or thinner material thickness.

The rotary vibrators 29, 32 are operated at 900 cycles/minutes, have a peak thrust of 573 lbf, weigh approximately 52 lbs. each have a horsepower rating of 0.28 hp, and are identified as Martin Engineering, Part No. C6028 16, Model CD9-570.

Figure 3:
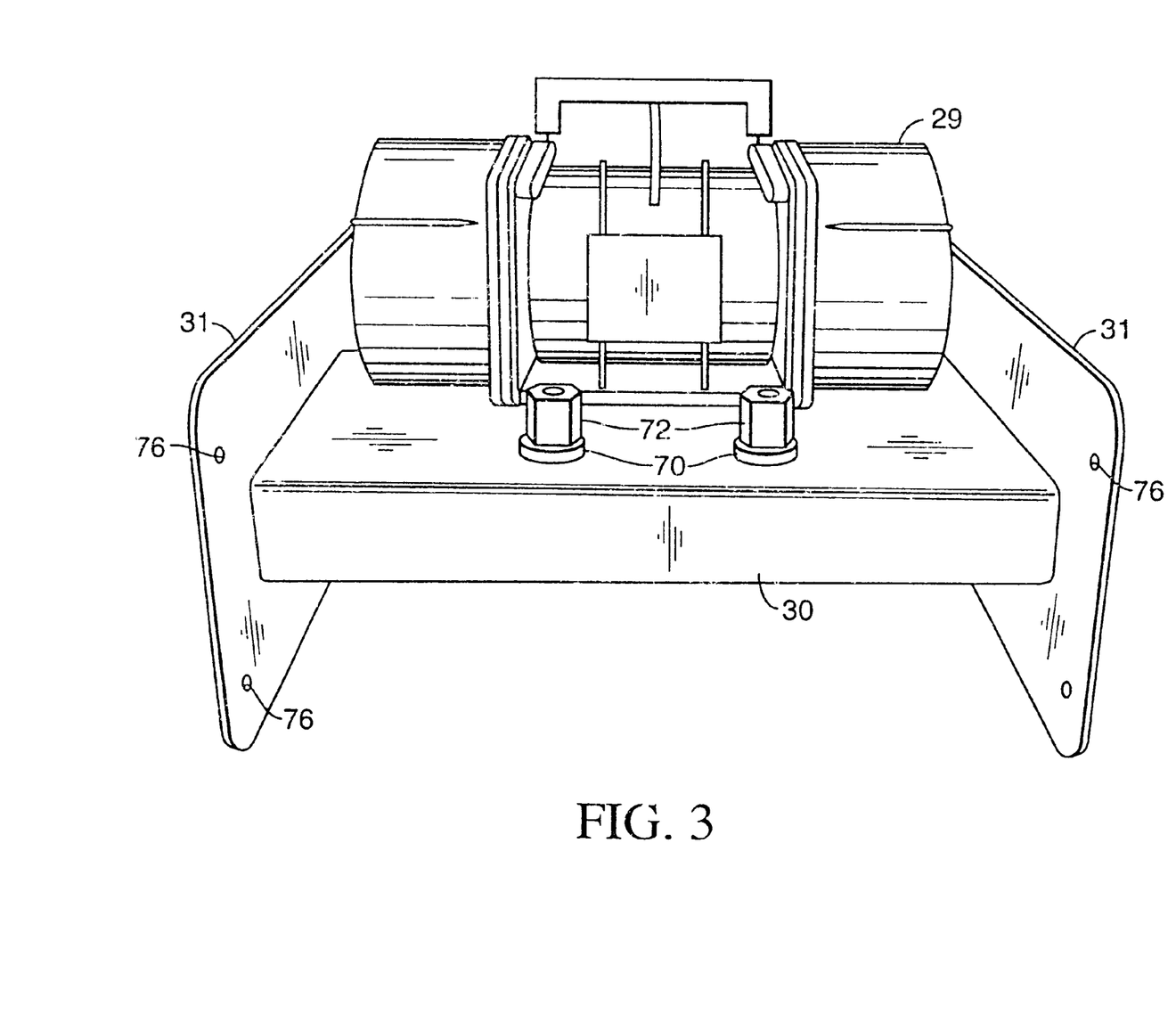
FIG. 3 is a front perspective view of a transverse beam of the conveying apparatus of FIG. 1 with one of two rotary vibrators in approximate position to be bolted to the transverse beam.
Figure 4:
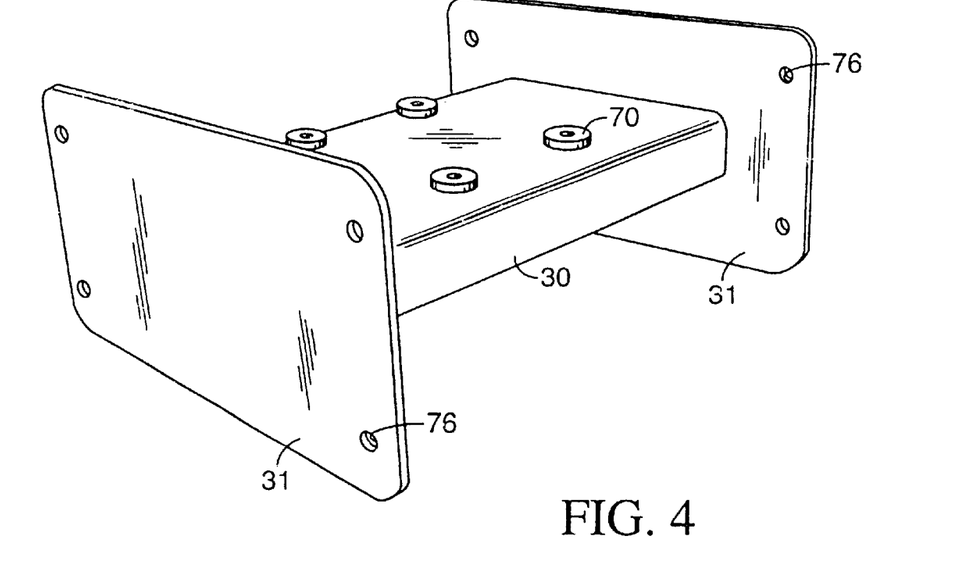
FIG. 4 is a perspective view of the transverse beam shown in FIG. 3.
Figure 5:
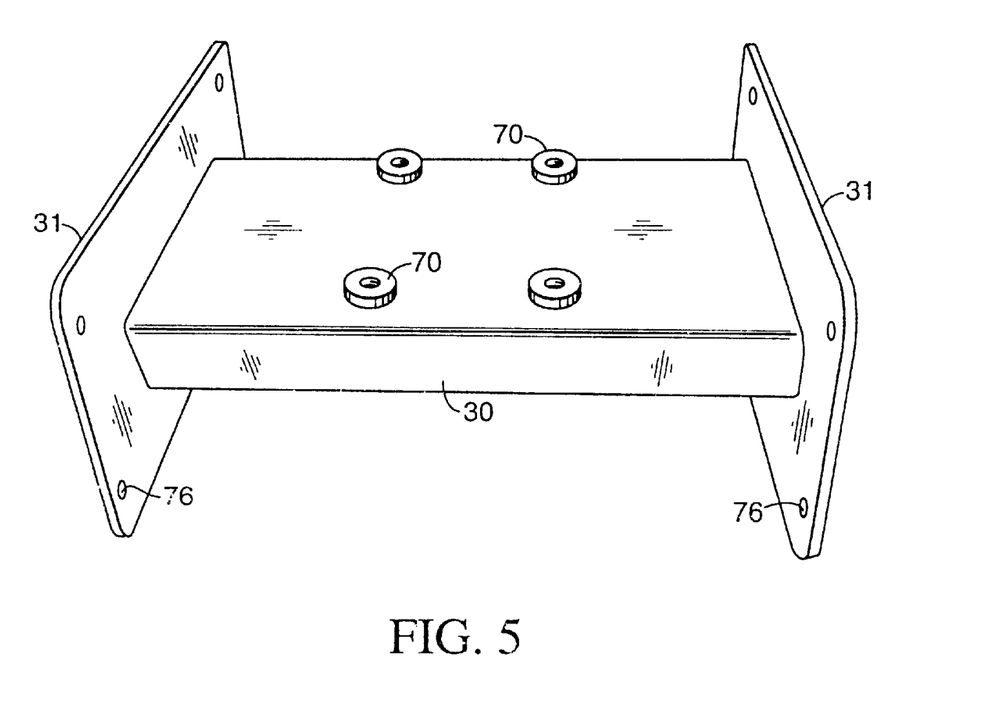
FIG. 5 is a front perspective view of the transverse beam shown in FIG. 3.
Figure 6:
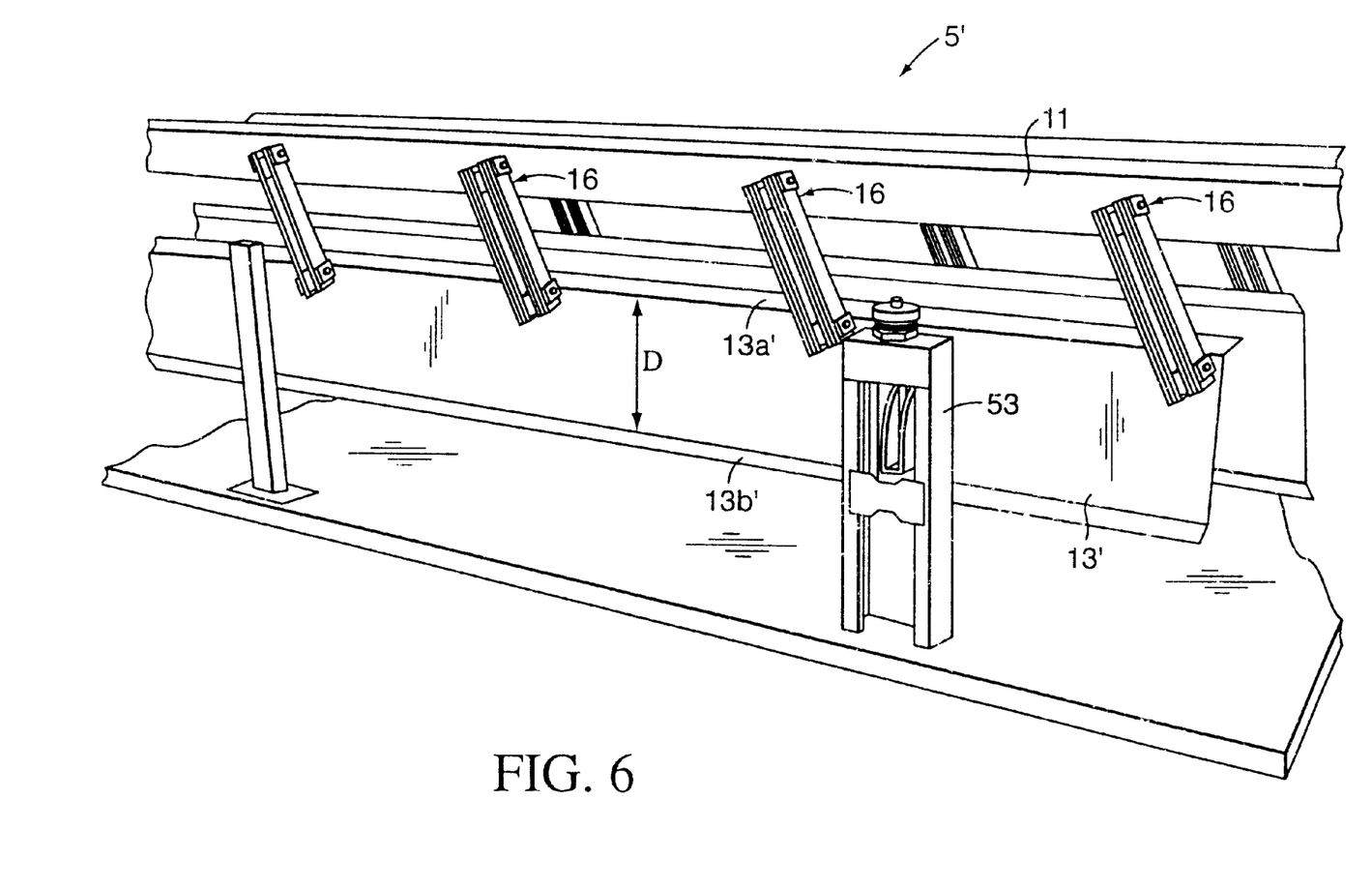
FIG. 6 is a front fragmentary, perspective view of an alternate conveying apparatus of the invention.
Figure 7:
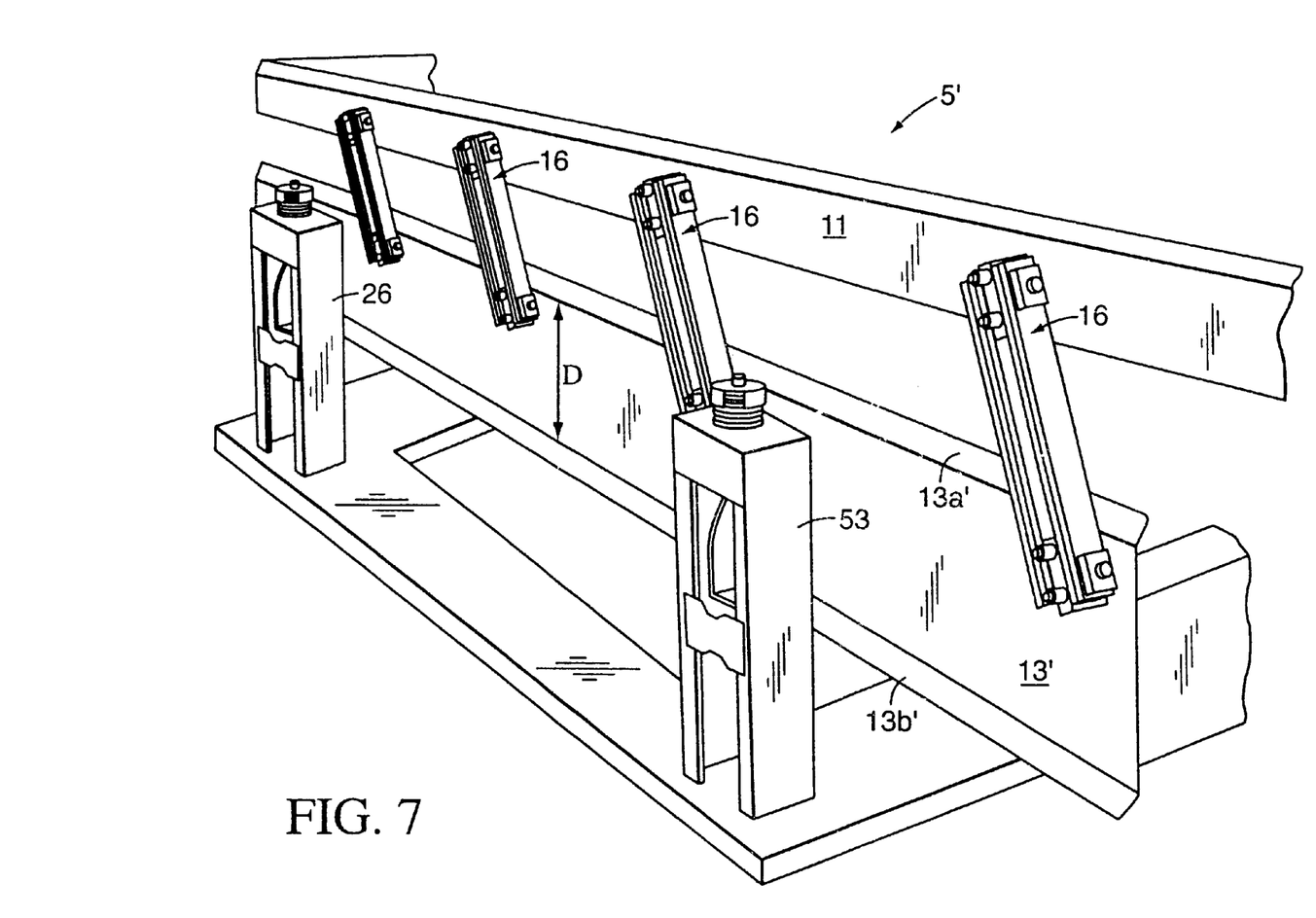
FIG. 7 is a fragmentary, perspective view of the alternate conveying apparatus shown in FIG. 6.

FIG. 3 illustrates the transverse beam 30 having the mounting plates 31 welded thereto. The rotary vibrator 29 is shown placed on the beam 30 in position to be bolted thereto. In this regard, the beam 30 includes threaded bosses 70 that extend through a depth of the beam 30. Bolts extend through mounting bosses 72 of the vibratory drive 29 to engage the bosses 70 to a depth less than half way into the threaded bosses 70. The second rotary vibrator 32 is bolted beneath the beam 30 through the same threaded bosses in a like manner. The mounting brackets 31 include a plurality of bolt holes 76 for receiving bolts that also pass through corresponding bolt holes in the wing plates 13. The transverse beam is comprised of a 10"×2" rectangular tube, having a ¼" wall thickness and being about 18" wide.

FIGS. 6 through 13 illustrate an alternate embodiment vibratory conveyor 5' that is substantially similar to the first embodiment except as indicated.

Identical reference numbers used on the first and second embodiments indicate substantially identical parts.

Figure 11:
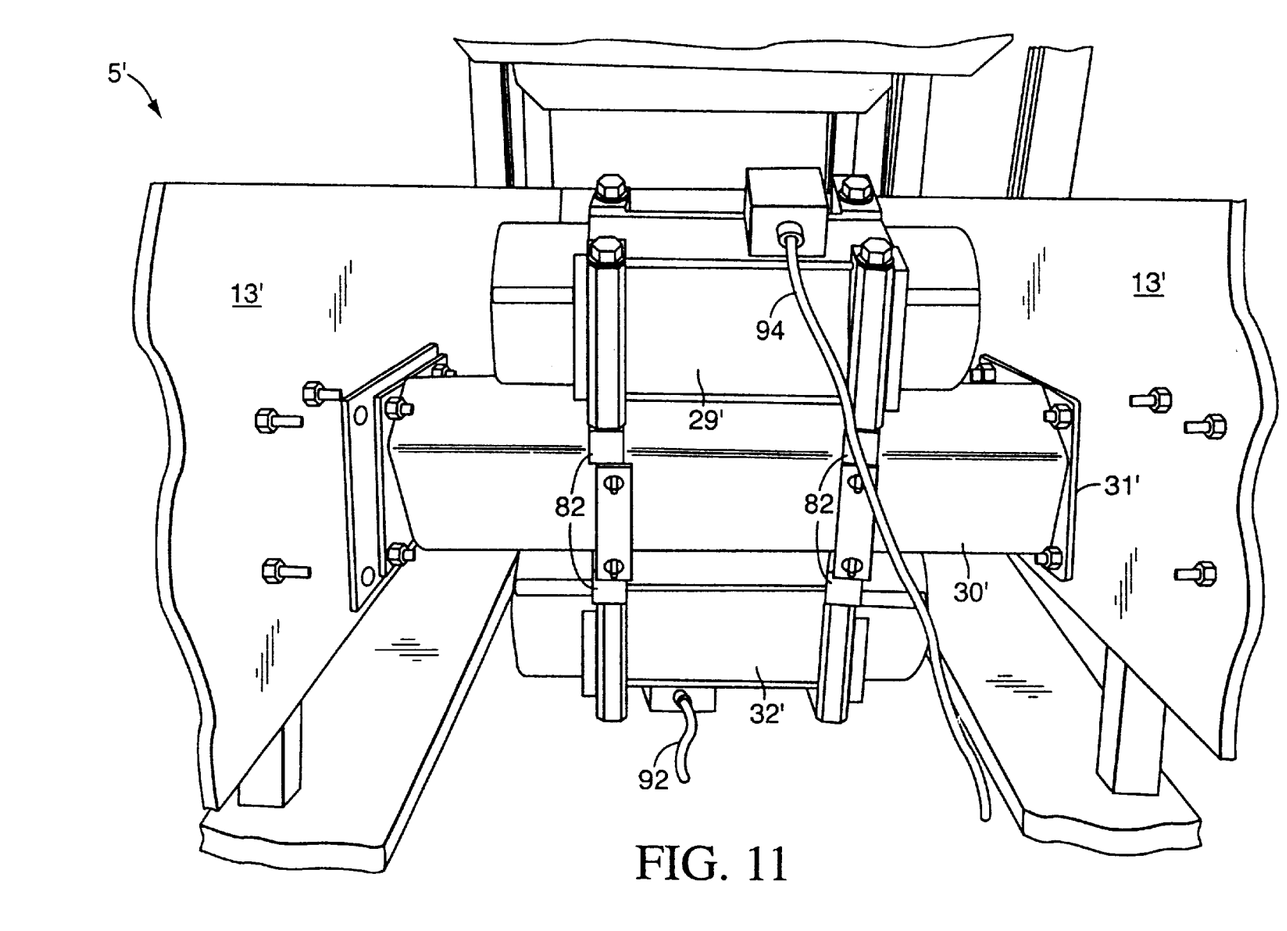
FIG. 11 is a further fragmentary, side perspective view of the apparatus of FIG. 6.

In the second embodiment, the wing plates 13' are substantially rectangular. Additionally, as shown in FIGS. 9 through 13, a modified transverse beam 30' is configured as a square tube rather than a substantially flat rectangular tube. In this regard, bars 82 are welded to a top and bottom surface of the transverse beam 30', the bars having threaded holes for receiving bolts for mounting the two rotary vibrators 29', 32'. As shown in FIG. 11, the rotary vibrators 29', 32' are a different model than in the first embodiment, however their operation is identical. In both embodiments electric power is provided to the rotary vibrators via cables 92 and 94.

The wing plates 13' each have a height D of approximately 14" and have 1½" wide upper and lower flanges 13a', 13b', the upper flange bent inwardly and the lower flange bent outwardly both at approximately a 30~ angle. The flanges provide for lateral stiffness of the wing plate. The wing plates preferably are composed of stainless steel and have a wall thickness of about 7 gauge or thinner material thickness.

The transverse beam 30' is comprised of a 5"×5" square steel tube of 1¼" thickness and is approximately 24" wide.

As more completely explained in U.S. Ser. No. 08/8 19,234, filed Mar. 17, 1997 herein incorporated by reference, for a base-excited conveyor design, the dynamic motion of the conveyor can be balanced without having to align the centers of gravity of the trough and base to be co-linear with the drive line. It is only necessary to balance the spring force of the two-mass system with the force generated by the linear drive, such that the stroke on the base member is virtually zero. Since the base has zero motion, the spring system can be somewhat evenly balanced about the center of gravity of the trough, and no unbalanced moments exist that cause a rotation, or a pitching of the base. Without motion of the base, the support structure has virtually only the static load of the conveyor resting thereon.

By balancing the forces acting on the base, the design of the base is dictated by required structural integrity considerations, and not weight for balancing the stroke of the trough. The base must be strong enough to withstand the imposed loads and have sufficient stiffness to avoid any natural bending frequency of the base structure that would be susceptible to excitation by the operating frequency of the conveyor. Thus, the weight of the base can be made lighter than prior art base-excited designs. The base being lighter, the overall weight of the conveyor can be made lighter, representing a lower installation cost for the user and reduced size and complexity of the support structure for the conveyor. According to the present invention, the base can be effectively structured at a relatively light weight in part by using the stiff lateral beams 30 or 30', in conjunction with relatively thin wing plates 13'.

From the foregoing, it will be observed that numerous modifications and variations can be effected without departing from the true spirit and scope of the novel concept of the present invention. It is to be understood that no limitation with respect to the specific embodiment illustrated herein is intended or should be inferred.

What is claimed is:

1. A vibratory conveying device, comprising:

an elongated trough for transporting materials;

a base underlying said trough;

a plurality of elongated leaf springs supporting said trough on said base; and a vibratory device system operatively connected to said base for effecting vibratory movement of said trough of transporting materials, said base comprising a pair of base side members each of a generally sheet-like configuration, and a laterally extending drive support member comprising a tubular member and a pair of mounting plates at respective opposite ends thereof, said drive support member extending between and detachably connected at respective ends thereof to said base side members by a plurality of mechanical fasteners extending through said mounting plates, said vibratory drive system being detachably mounted on said drive support member by another plurality mechanical fasteners.

2. A vibratory conveying device in accordance with claim 1, wherein:

said vibratory drive system comprises a pair of rotary vibratory drives connected to said drive support member, said drive support member having a natural bending frequency at least four times higher than the operating speed of the conveying device.

3. A vibratory conveying device, comprising:

an elongated trough for transporting materials;

a base underlying said trough;

a plurality of springs supporting said trough on said base; and a vibratory drive system operatively connected to said base for effecting vibratory movement of said trough for transporting materials, said base comprising a pair of base side members, and a laterally extending drive support member comprising a tubular member extending between and detachably connected at respective ends thereof to said base side members by a plurality of mechanical fasteners, said vibratory drive system being mounted on said drive support member said vibratory drive system comprising a pair of rotary vibratory drives detachably mounted on respective opposite sides of said drive support member by another plurality of mechanical fasteners said drive support member having a natural bending frequency at least four times higher than the operating speed of the conveying device.

4. A vibratory conveying device in accordance with claim 3, wherein:

said drive support member includes a pair of mounting plates at respective opposite ends thereof, for respective detachable connection to said base side members with mechanical fasteners.

5. A vibratory conveying device in accordance with claim 4, wherein:

said tubular member extending between said pair of mounting plates.

6. A vibratory conveying device in accordance with claim 4, wherein:

each of said base side members is of a generally sheet-like configuration.

7. A vibratory conveying device in accordance with claim 4, wherein:

said plurality of springs comprise a plurality of elongated leaf springs.

8. A vibratory conveying device, comprising:

an elongated trough for transporting materials;

a base underlying said trough;

a plurality of elongated leaf springs supporting said trough on said base; and a vibratory device system operatively connected to said base for effecting vibratory movement of said trough for transporting materials, said base comprising a pair of base side members each of a generally sheet-like configuration, and a laterally extending drive support member extending between and detachably connected to said base side members, said vibratory drive system being mounted on said drive support member, said drive support member including a pair of mounting plates at respective opposite ends thereof for respective detachable connection to said base side members with mechanical fasteners, and a transverse beam extending between said pair of mounting plates, said vibratory drive system including a pair of vibratory drives respectively mounted on opposite sides of said transverse beam.

9. A vibratory conveying device in accordance with claim 8, wherein:

said transverse beam includes a plurality of threaded openings on the opposite sides thereof for removably counting said vibratory drives with threaded fasteners.

10. A vibratory conveying device in accordance with claim 5, wherein:

said transverse beam comprises a tubular member configured as a square tube, said drive support member including mounting bars welded to opposite sides thereof, said mounting base defining threaded openings therein, said pair of vibratory drives being removably mounted on opposite sides thereof with mechanical fasteners received in the threaded opening defined by said mounting bars.

11. A vibratory conveying device, comprising:

an elongated trough for transporting materials;

a base underlying said trough;

a plurality of springs supporting said trough on said base; and a vibratory drive system operatively connected to said base for effecting vibratory movement of said trough for transporting materials, said base comprising a pair of base side members, and a laterally extending drive support member extending between and detachably connected to said base side members, said vibratory drive system being mounted on said drive support member, said drive support member having a natural bending frequency at least four times higher than the operating speed of the conveying device, said drive support member including a pair of mounting plates at respective opposite ends thereof, for respective detachable connection to said base side members with mechanical fasteners, said drive support member defining a plurality of threaded openings on opposite sides thereof, said vibratory drive system comprising a pair of vibratory drives removably mounted on respective opposite sides of said drive support member with mechanical fasteners received in said threaded openings.

12. A vibratory conveying device, comprising:

an elongated trough for transporting materials;

a base underlying said trough;

a plurality of springs supporting said trough on said base; and a vibratory drive system operatively connected to said base for effecting vibratory movement of said trough for transporting materials, said base comprising a pair of base side members, and a laterally extending drive support member extending between and detachably connected to said base side members, said vibratory drive system being mounted on said drive support member, said drive support member having a natural bending frequency at least four times higher than the operating speed of the conveying device, said drive support member including a pair of mounting plates at respective opposite ends thereof, for respective detachable connection to said base side members with mechanical fasteners, said plurality of springs comprising a plurality of elongated leaf springs, and said vibratory drive system comprising a pair of rotary vibratory drives mounted on respective opposite sides of said drive support member.

* * * * *